March 5, 1968   M. WIENAND   3,371,457
STRUCTURAL PART MADE OF PLASTIC MATERIAL
Filed Sept. 8, 1964   3 Sheets-Sheet 1

INVENTOR
MICHAEL WIENAND
BY Dicke + Craig
ATTORNEYS

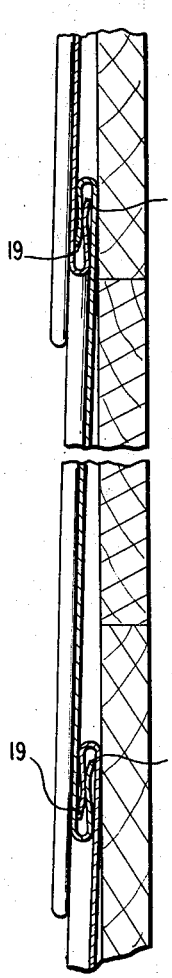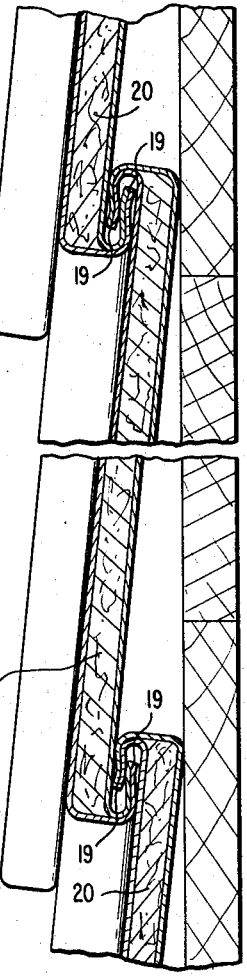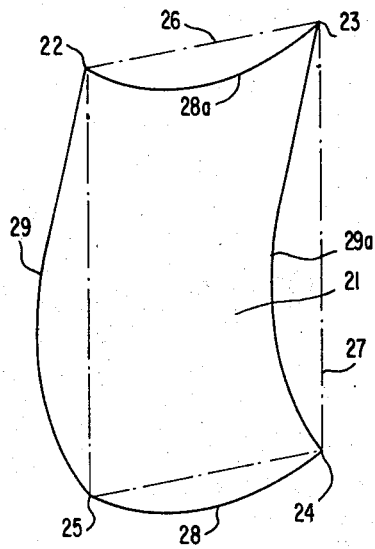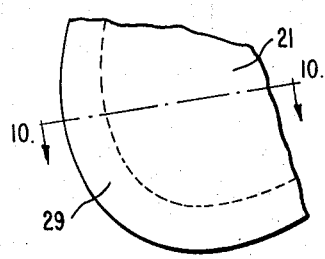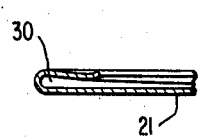

March 5, 1968 M. WIENAND 3,371,457
STRUCTURAL PART MADE OF PLASTIC MATERIAL
Filed Sept. 8, 1964 3 Sheets-Sheet 3
FIG.11a FIG.11b FIG.12
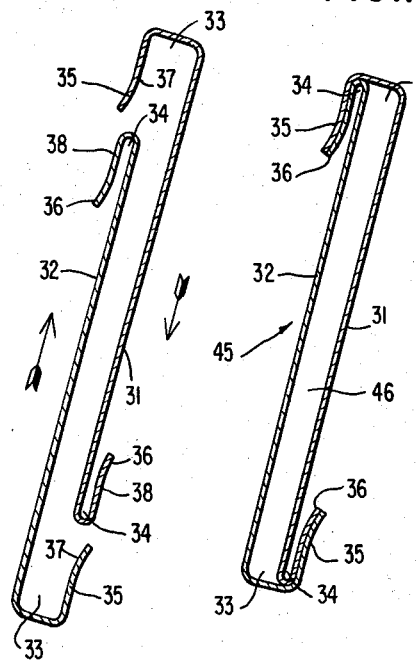
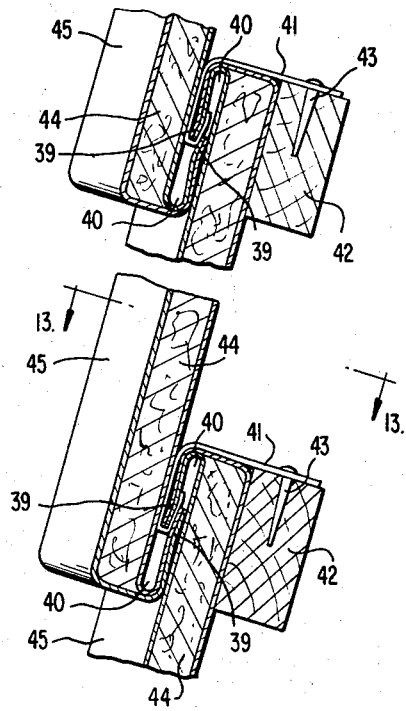
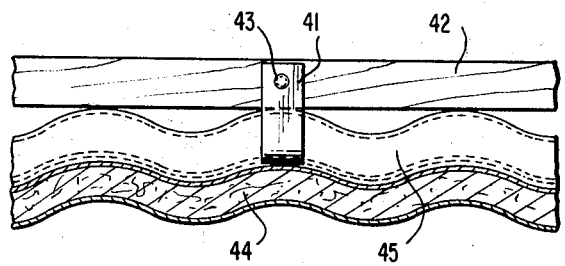
FIG.13
INVENTOR
MICHAEL WIENAND
BY Dicke & Craig
ATTORNEYS

United States Patent Office 3,371,457
Patented Mar. 5, 1968

3,371,457
STRUCTURAL PART MADE OF PLASTIC
MATERIAL
Michael Wienand, Siegburg, Germany, assignor to
Dynamit Nobel Aktiengesellschaft, Troisdorf,
Germany
Filed Sept. 8, 1964, Ser. No. 394,657
Claims priority, application Germany, Sept. 7, 1963,
D 27,520, D 27,521
17 Claims. (Cl. 52—404)

The present invention relates to a simple structural part of plastic material for roof coverings, wall covers or the like which can be manufactured relatively inexpensively and which assures a good seal with sufficiently large thermal expansion capability.

According to the present invention this structural part is characterised in that it is constructed as plate of square, rectangular, or trapezoidal shape or the like, either plane, profiled, curved or the like, which is bent over toward opposite sides into approximately U-shaped hooks within the area of two or of each two mutually opposite edges, whereby the free leg portions of the hooks are so formed and shaped that the width of the hooks is initially somewhat reduced in the direction toward the end of their free leg portions and thereupon is again increased, and whereby the width of the hooks is so dimensioned that similar structural parts may be interconnected or hung into one another with the hooks thereof.

By the construction of the hooks in accordance with the present invention a good mutual clamping between the individual structual parts may be achieved with a corresponding dimensioning thereof, whereby a good connection is assured, safeguarded against undesired disengagement by the spring elasticity of the free leg portions of the hooks. At the same time, sufficient freedom of movement remains for the structural parts in order to expand or contract in a corresponding manner during temperature changes, without producing thereby stresses within the structural parts.

This is also true for the case that the plate according to a further feature of the present invention is constructed of two identical joined parts provided with relatively wide hooks toward one side and relatively narrow hooks toward the opposite side, which two parts are combined into a double-shell structural part by the mutually close abutment of the outer surface of each free leg portion of the narrow hook or hooks thereof at the inner surface, formed to cover the same area, of each free leg portion of the wide hook or hooks thereof.

It may thereby suffice under certain circumstances to simply slide the plate parts one into the other, and more particularly in that case when the hollow space between the two plates is completely filled with a fibreglass insert with a foam or expanded plastic mat or the like. In such a case the type of construction of the hooks mentioned above prevents that the plate parts unintentionally disengage from one another. Of course, in the interest of a greater safety, or also in the case when the hollow space between the space parts is not to be filled out, a connection may be provided between the plate parts, for example, in such a manner that one wide and one narrow hook each are permanently or detachably connected with ecah other by bonding, gluing, welding or by a threaded connection.

Accordingly, it is an object of the present invention to provide a structural part of the type described above, made of plastic material, which obviates the shortcomings and drawbacks encountered with the prior art constructions yet is simple in structure, easy to manufacture and inexpensive to install.

Another object of the present invention resides in the provision of a structural part of plastic material to be used, for example, as roof tile, wall cover, and the like which not only assures a good seal but possesses at the same time a sufficiently large thermal expansion capability to prevent internal stresses in the assembled structure in case of temperature fluctuations.

Still a further object of the present invention resides in the provision of a structural part of plastic material that may be assembled into a unitary structure in such a manner that good mutual clamping between the individual structural parts is achieved, assuring a safe connection againts inadvertent and unintentional disengagement of the parts.

A further object of the present invention resides in the provision of a plastic tile adapted to be assembled into a unitary assembly by simple means which is able to contract and expand as necessary in case of temperature changes without danger of internal stresses and/or unintentional loosening of the parts.

These and other objects, features, and advantages of the present invention will become more obvious from the following description when taken in connection with the accompany drawing which shows, for purposes of illustration only, several embodiments in accordance with the present invention, and wherein FIGURE 1 is an end elevational view of four structural parts in accordance with the present invention connected with one another and constructed as square roof tiles;

FIGURE 6 is a partial cross-sectional view, similar to FIGURE 5 through one embodiment of a roof covering by means of single-shell roof tiles in accordance with the present invention;

FIGURE 7 is a partial cross-sectional view, similar to FIGURE 6, of another embodiment of a roof cover by means of double-shell roof tiles in accordance with the present invention;

FIGURE 8 is a schematic view of still further embodiment of a roof tile in accordance with the present invention;

FIGURE 9 is a partial elevational view explanatory of the roof tile schematically illustrated in FIGURE 8;

FIGURE 10 is a partial cross-sectional view taken along line 10—10 of FIGURE 9;

FIGURE 11a is a cross-sectional view of a double-shell structural part in accordance with the present invention provided with hooks only at the upper and lower ends thereof, shown in the position prior to assembly of the plate-like parts;

FIGURE 11b is a cross-sectional view through the double-shell structural part of FIGURE 11a upon assembly of the plate-like parts thereof;

FIGURE 12 is a partial cross-sectional view through a roof cover utilizing the structural parts of FIGURES 11a and 11b, and FIGURE 13 is a partial cross-sectional view taken along line 13—13 of FIGURE 12, illustrating a possible construction for the double-shell realization of FIGURE 12.

Figure 1:
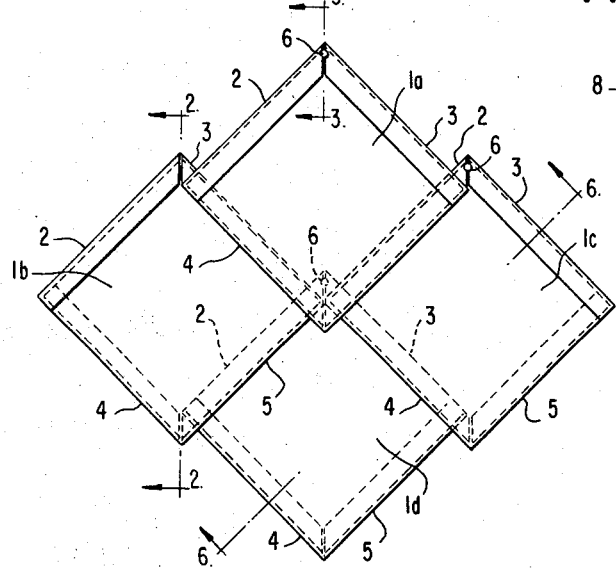
Figures 2, 3:
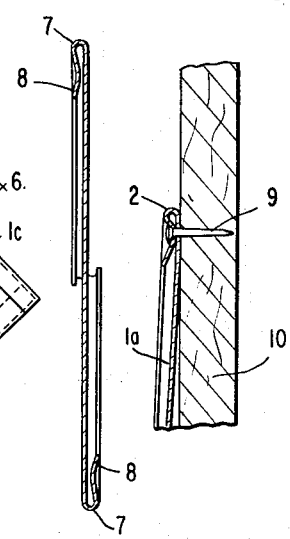
FIGURE 2 is a cross-sectional view, on an enlarged scale, through one roof tile in accordance with the present invention, taken along line 2—2 of FIGURE 1.
FIGURE 3 is a partial cross-sectional view through a roof tile in accordance with the present invention secured to a corresponding base, the cross section being taken along line 3—3 FIGURE 1.

Referring now to the drawing wherein like reference numerals are used throughout the various views to designate like parts, and more particularly to FIGURE 1, the square roof tiles are designated therein by reference numerals 1a, 1b, 1c, and 1d. Each of the roof tiles 1a–1d is provided with two upper edges 2 and 3 formed into hooks in the forward direction and with two lower edges 4 and 5 formed into hooks in the rearward direction. The tiles 1a–1d are thereby so arranged that each two adjacent ones interengage with the hooks thereof so that they overlap. Apertures or holes 6 are provided in the tiles 1a, 1c, and 1d for securing the same to the base. As shown in connection with the tile 1b, such a securing means may also be dispensed with under certain circumstances in connection with all the tiles. For example, the apertures 6 might also be provided only in the tile of the uppermost row, that is, for example, in the tile 1a as well as in further tiles (not illustrated) arranged adjacent thereto at the same height. As shown in FIGURE 3 which illustrates a cross section along line 3—3 of FIGURE 1, the securing may take place by means of a simple nail 9 which is driven into the base 10 through the apertures 6.

According to the cross section of FIGURE 2 corresponding to a cross section taken along line 2—2 of FIGURE 1, the tile is constructed as a substantially plane or flat plate. The hooks 7 initially become somewhat narrower in the direction toward the end of the free leg portions 8 of the hooks 7 and thereupon again become wider.

As may be readily seen from FIGURE 1, there may be added to the structure, which is composed of the four individual tiles illustrated in this figure, additional similar assemblies each composed of four tiles. However, it follows therefrom that this structure or assembly, instead of consisting of four combined or assembled tiles, may also consist of a single element in which the mutual overlaps between the individual tiles are indicated by a corresponding stamping or embossment so that it creates the impression as if it were in fact composed of four combined tiles. This measure is recommended, for example, if one desires to create the impression of very small tiles without, however, having to accept an increase in the cost of manufacture and assembly.

Figures 4, 5:
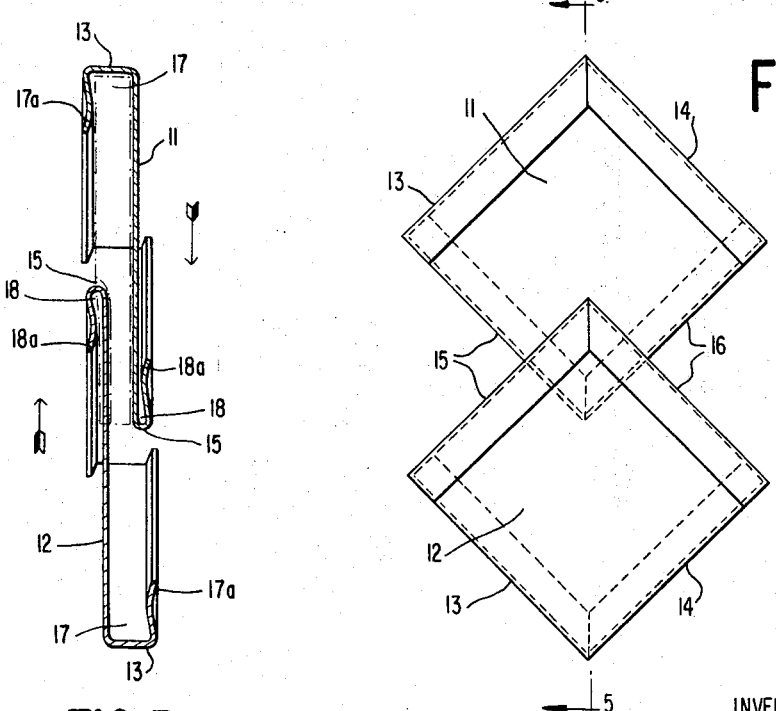
FIGURE 4 is an end elevational view of a modified embodiment of two plate parts which, when combined, form a double-shell roof tile in accordance with the present invention.
FIGURE 5 is a cross-sectional view taken along line 5—5 of FIGURE 4.

FIGURES 4 and 5 again illustrate in elevation and cross section two square plate-like parts 11 and 12 whose two edges 13 and 14 are formed in the direction toward one side into wide hooks 17 and whose two edges 15 and 16 are formed in the direction toward the opposite side into narrow hooks 18. If the two plate-like parts 11 and 12 are arranged with respect to each other according to FIGURE 5 so as to have a point of symmetry, then they may be readily combined by a simple sliding movement in the direction indicated by the arrows into a double-shell-like roof tile. The hooks, and more particularly the hook 17 of one plate and the hook 18 of the other plate are appropriately connected with each other upon mutual assembly by such interengaging displacement in any conventional manner, for instance, by bonding, gluing, cementing, welding, screwing or the like, either permanently or detachably. However, such a connection of the hooks with each other may also be dispensed with when, for example, a fiberglass insert, a foamy plastic mat or the like is inserted between the plate parts 11 and 12 for purposes of heat- and/or sound-insulation and this insert, as indicated in dash line in FIGURE 5, is of such thickness that when sliding the two plate parts 11 and 12 into one another it is necessarily and forcible compressed somewhat. By reason of the natural tendency of the fiberglass insert or of the foamy plastic mat or the like to expand again to the initial size, the free leg portions 17a and 18a of the hooks 17 and 18 are securely pressed against one another whereby the curved form of the free leg portions of the hooks prevents that the plates become disengaged from one another unintentionally. Of course, one may also proceed in such a manner that the two plate parts 11 and 12 are initially combined and assembled in the manner provided and are connected with each other by means of the free leg portions of the hooks and that only thereupon a fiberglass or plastic foam plastic filler is accommodated between the two plate parts 11 and 12.

According to the cross section of FIGURES 6 and 7, to be thought of as taken along line 6—6 of FIGURE 1, the free leg portions of the hooks mutually so engage with each other over the entire length thereof with the curved surfaces thereof both in the case of the single-shell roof tiles of FIGURE 6 as well as also in the case of the double-shell roof tiles of FIGURE 7 that in case of disengagement or separation of the plates from each other the curved surfaces of the hooks have to be necessarily pressed flat somewhat whereby, however, an unintentional disengagement of the plates from one another is securely prevented whereas, on the other hand, by reason of a sufficient elasticity of the leg portions of the hooks, a sufficient freedom of movement of the plates with respect to each other remains for a change in length thereof due to temperature fluctuations. Of course, the free leg portions of the hooks are thereby so constructed that they mutually overlap with the highest points 19 of the arcuate or curved portions thereof in a sufficient manner also with the greatest changes in length to be expected that is, are also so clamped one to the other that the plates cannot become disengaged by themselves. With the double-shell tiles of FIGURE 7 reference numeral 20 designates an insert of fiberglass, foamy plastic material or the like for purposes of insulation.

The roof tile 21 of parallelogram-like shape shown in schematic illustration in FIGURE 8 and representing a special one of numerous other possible embodiments, is provided, for example, only with three visible corners 22, 23, 24 whereas the fourth corner 25 has practically disappeared. This form of the tile is created in that both the straight connecting line 26 between the corners 22 and 23 as well as also the connecting line 27 between the corners 23 and 24 are displaced parallelly whereas the actual outer boundary of the roof tile does not extend rectilinearly but instead is curved, and more particularly in such a manner that the actual boundary line 28 between the imaginary corner and the corner 24 adjoins without corner or kink the actual boundary line 29 between the corner 22 and the imaginary corner 25. As shown in FIGURE 9, the edge 29 of the roof tile extending from the corner 24 is again formed into a hook 30 pointing toward the rear which according to the cross section of FIGURE 10 may again have the same form as already described above. The edges 28a and 29a of the roof tile extending from the corner 22 by way of corner 23 to the corner 24 are then correspondingly formed into a similar hook 30 pointing toward the front.

According to FIGURES 11a and 11b each of the two plate-like parts 31 and 32 is provided with a wide hook 33 and with a narrow hook 34, whereby the wide and narrow hooks are in each case of identical shape so that the two structural elements 31 and 32, upon assembly thereof into the completed structural part 45 by sliding the same into one another in the direction of the arrows, extend exactly parallel to one another, and whereby each inner surface 37 of the free leg portion 35 of a wide hook 33 and the outer surface 38 of the free leg portion 36 of a narrow hook 34 abut closely against one another. Both the leg portions 35 of the hooks 33 as well as also the leg portions 36 of the hooks 34 are provided with a slight kink or bend so that the hooks intended for interconnection of the structural part 45 with other identical structural parts is initially somewhat reduced in cross section and then again becomes wider toward the end of the free leg portions.

In the embodiment illustrated in FIGURE 12 for the application of the structural parts to a roof covering, each of the structural parts 45 is secured at the roof slat 42 by means of a sheet metal element 41 made, for example, of zinc or any other suitable material surrounding in a hook-like manner and securing the free portion 39 of the upper of the two hooks 40 intended for the mutual interconnection of the structural parts, whereby the connection between sheet metal member 41 and roof slat 42 is established by means of a nail 43. The free leg portion 39 of the lower hook 40 of one structural part 45 engages into the upper hook 40 of the next adjoining structural part 45 over such a distance that in addition to a good seal also a good clamping and therewith a safe securing against unintentional disengagement is produced between the strutcural parts 45 whereby, however, as a result of the elasticity of the free leg portions of the hooks there exists the possibility that the structural parts 45 can move with respect to one another in case of a change of their position corresponding to any temperature changes to a sufficient extent and without any substantial impairment in that one structural part moves with its lower hook into or out of the secured upper hook of the next adjoining structural part. The intermediate space 46 between the structural elements 31 and 32 of each structural part 45 is thereby filled with an insulating material 44.

According to the cross section of FIGURE 13 the structural parts 45 are thereby constructed of undulated shape. Of course, it is within the scope of the present invention to construct the structural parts also flat or of any other cross section. As may be seen from FIGURE 13, the sheet metal elements 41 serving as securing means of the structural parts 45 at the roof slats 42 are constructed as relatively narrow strips. Depending upon individual requirements, additional similar sheet metal elements 41 which may, of course, also be constructed of greater width are provided at corresponding distances from each other.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intended to cover all such changes and modifications as are encompassed by the scope of the appended claims.

I claim:

1. A structural unit of material for roof shingles, wall coverings, or the like which comprises a first and a second identical plate-like structure, each of said plate-like structures comprising a main plate portion, a web portion and a flange portion, said web and flange portions forming with said main plate portion a hook-like end section, the two adjacent hook-like end sections of said plate-like structure extending toward one side of said main plate portion and spaced from the main plate portion by the web portion, said plate-like structure having corresponding hook-like end sections at the other adjacent edges and extending toward the other side of said main plate portion, the opposing, adjacent hook-like end sections containing wide and narrow web portions respectively, the outer surface of the flange portion of the hook-like end section with the narrow web of said first plate-like structure being complementary with the inner surface of the flange portion of the hook-like end section with the wide web of said second plate-like structure, the other edges of said first and second identical plate-like structures being similarly disposed, said first and second plates thus defining a free space between said plates.

2. The structural unit of claim 1, wherein the flange portion of the hook-like end sections curves toward and away from the main plate portion.

3. A surface comprising a plurality of the structural units of claim 1 in interlocking relationship with each other.

4. The structural unit of claim 1, wherein the free space is filled with an insulating material.

5. The structural unit of claim 1, wherein said structural unit is a plastic material.

6. The structural unit of claim 1, wherein the complementary portions of the first and second plate-like structures are bonded together.

7. A structural part according to claim 1, wherein said plate-like structure is of square shape.

8. A structural part according to claim 1, wherein said plate-like structure is of rectangular shape.

9. A structural part according to claim 1, wherein said plate-like stucture is of trapezoidal shape.

10. A structural part according to claim 1, wherein said plate-like structure is of parallelogram-like shape.

11. A structural part according to claim 1, wherein said plate-like structure is of substantially flat shape.

12. A structural part according to claim 1, wherein said plate-like structure is of profiled cross section.

13. A structural part according to claim 1, wherein said plate-like structure is of arcuate cross section.

14. A structural part of plastic material for roof covers, wall coverings, or the like comprising:
a plate-like structure having a plurality of edge portions and provided with approximately U-shaped hook means within the area of two edge portions extending toward opposite sides of the plate-like structures, said hook means including free leg portions of such shape that the width of a respective hook means initially decreases slightly in the direction toward the end of the respective free leg portion and then again increases, and the width of the hook means being so dimensioned that similar structural parts may be interconnected by the hook means thereof,
the plate-like structure including two identical plate like parts combined with each other to form a double-shell structural part, each of said two identical plate-like parts being provided with a relatively wide hook means pointing toward one side and with a relatively narrow hook means pointing toward the opposite side, the outer surface of the free leg portions of a respective narrow hook means closely abutting against the inner surface of the free leg portion of a respective wide hook means with the inner and outer surfaces covering about equal area.

15. A plate-like structure according to claim 14, further comprising means permanently connecting with each other mutually abutting inner and outer surfaces of the free leg portions of the hook means.

16. A plate-like structure according to claim 14, further comprising means detachably connecting with each other mutually abutting inner and outer surfaces of the free leg portions of the hook means.

17. A structural part of plastic material for roof covers, wall coverings, or the like comprising:
a plate-like structure having a plurality of edge portions and provided with approximately U-shaped hook means within the area of two edge portions extending toward opposite sides of the plate-like structure, said hook means including free leg portions of such shape that the width of a respective hook means initially decreases slightly in the direction toward the end of the respective free leg portion and then again increases, and the width of the hook means being so dimensioned that similar structural parts may be interconnected by the hook means thereof, the plate-like structure including two identical plate like parts combined with each other to form a structural part, each of said two identical plate-like parts being provided with a relatively wide hook means pointing toward one side and with a relatively narrow hook means pointing toward the opposite side, the outer surface of the free leg portion of a respective narrow hook means closely abutting against the inner surface of the free leg portion of a respective wide hook means with the inner and outer surfaces covering about equal area, and the space between the two plate-like parts being filled with insulating material.

References Cited

UNITED STATES PATENTS

| | | | |
|---|---|---|---|
| 1,753,303 | 4/1930 | Reynolds | 52—531 |
| 2,243,256 | 5/1941 | Miller | 52—530 |
| 2,601,833 | 7/1952 | Olsen | 52—530 |
| 2,631,552 | 3/1953 | Korter | 52—530 |

FOREIGN PATENTS 193,588    1957   Austria.

FRANK L. ABBOTT, *Primary Examiner.*

ROBERT A. STENZEL, *Assistant Examiner.*